(12) United States Patent
Noh et al.

(10) Patent No.: US 9,210,001 B2
(45) Date of Patent: Dec. 8, 2015

(54) METHOD AND APPARATUS FOR TRANSMITTING APERIODIC SOUNDING REFERENCE SIGNAL IN WIRELESS COMMUNICATION SYSTEM

(75) Inventors: Min Seok Noh, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 172 days.

(21) Appl. No.: 13/995,008

(22) PCT Filed: Dec. 16, 2011

(86) PCT No.: PCT/KR2011/009718
§ 371 (c)(1),
(2), (4) Date: Jun. 17, 2013

(87) PCT Pub. No.: WO2012/081932
PCT Pub. Date: Jun. 21, 2012

(65) Prior Publication Data
US 2013/0265977 A1 Oct. 10, 2013

Related U.S. Application Data

(60) Provisional application No. 61/424,060, filed on Dec. 17, 2010.

(51) Int. Cl.
*H04W 4/00* (2009.01)
*H04L 25/02* (2006.01)
(Continued)

(52) U.S. Cl.
CPC .......... *H04L 25/0224* (2013.01); *H04L 5/0051* (2013.01); *H04W 72/042* (2013.01); *H04L 5/0078* (2013.01); *H04L 5/0091* (2013.01)

(58) Field of Classification Search
CPC .. H04L 27/2613; H04L 5/0048; H04W 72/12
USPC ......................................... 370/329, 203, 254
See application file for complete search history.

(56) References Cited

U.S. PATENT DOCUMENTS

2010/0246561 A1* 9/2010 Shin et al. ...................... 370/345
2011/0096751 A1 4/2011 Ma et al.
(Continued)

FOREIGN PATENT DOCUMENTS

KR 10-2005-0121136 A 12/2005
KR 10-2009-0128576 A 12/2009
(Continued)

OTHER PUBLICATIONS

Ericsson, Further Details on SRS for Release 10, TSG-RAN WG1 #60bis, R1-101746, Apr. 12-16, 2010.*
(Continued)

*Primary Examiner* — Andrew Chriss
*Assistant Examiner* — Romani Ohri
(74) *Attorney, Agent, or Firm* — Birch, Stewart, Kolasch & Birch, LLP

(57) ABSTRACT

Provided are a method and an apparatus for transmitting an aperiodic sounding reference signal (SRS) in a wireless communication system. A terminal receives from a base station a triggering signal for triggering the transmission of the aperiodic SRS and the number of transmissions of the aperiodic SRS, and transmits the aperiodic SRS to the base station the number of times equal to the number of transmissions, using a plurality of subframes, on the basis of the triggering signal.

10 Claims, 9 Drawing Sheets

(51) Int. Cl.
*H04L 5/00* (2006.01)
*H04W 72/04* (2009.01)

(56) References Cited

U.S. PATENT DOCUMENTS

2012/0033643 A1    2/2012  Noh et al.
2013/0194908 A1*   8/2013  Gao et al. .................... 370/203

FOREIGN PATENT DOCUMENTS

| KR | 10-2010-0051530 A | 5/2010 |
|---|---|---|
| KR | 10-2010-0075642 A | 7/2010 |
| WO | WO 2009/052420 A2 | 4/2009 |

OTHER PUBLICATIONS

Panasonic, SRS enhancement for LTE-Advanced, 3GPP TSG RAN WG1 Meeting #60bis, R1-102040, Apr. 12-16, 2010.*
ASUSTeK, Discussion on Dynamic Aperiodic Sounding, 3GPP TSG RAN WG1 Meeting #60bis, R1-102357, Apr. 12-16, 2010.*
Mediatek Inc., Further Discussion on Aperiodic Sounding, 3GPP TSG RAN WG 1 Meeting #60bis, RI-101985, Apr. 12-16, 2010.*

* cited by examiner

METHOD AND APPARATUS FOR TRANSMITTING APERIODIC SOUNDING REFERENCE SIGNAL IN WIRELESS COMMUNICATION SYSTEM

CROSS REFERENCE TO RELATED APPLICATIONS

This application is the National Phase of PCT/KR2011/009718 filed on Dec. 16, 2011, which claims priority under 35 U.S.C. 119(e) to U.S. Provisional Application No. 61/424,060 filed on Dec. 17, 2010, all of which are hereby expressly incorporated by reference into the present application.

BACKGROUND OF THE INVENTION

1. Field of the Invention

The present invention relates to wireless communications, and more particularly, to a method and apparatus for transmitting an aperiodic sounding reference signal in a wireless communication system.

2. Related Art

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h} = y/p = h + n/p = h + \hat{n} \qquad \text{<Equation 1>}$$

The accuracy of the channel estimation value $\hat{h}$ estimated using the reference signal p is determined by the value $\hat{n}$. To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

An uplink reference signal can be classified into a demodulation reference signal (DMRS) and a sounding reference signal (SRS). The DMRS is a reference signal used for channel estimation to demodulate a received signal. The DMRS can be associated with PUSCH or PUCCH transmission. The SRS is a reference signal transmitted for uplink scheduling by a user equipment to a base station. The base station estimates an uplink channel by using the received SRS, and the estimated uplink channel is used in uplink scheduling. Transmission of the SRS may be referred to the section 5.5.3 of 3GPP TS 36.211 V9.1.0 (2010-03), and an operation of a user equipment in an SRS transmission process may be referred to the section 8.2 of 3GPP TS 36.213 V9.1.0 (2010-03).

A SRS may be transmitted periodically or may be transmitted aperiodically by being triggered by a base station when the base station needs to transmit the SRS. A method for efficiently transmitting an aperiodic SRS is required.

SUMMARY OF THE INVENTION

The present invention provides a method and apparatus for transmitting an aperiodic sounding reference signal (SRS) in a wireless communication system. The present invention presents a method for transmitting an aperiodic SRS at multiple times by a triggering signal to trigger transmission of the aperiodic SRS.

In an aspect, a method for transmitting an aperiodic sounding reference signal (SRS) by a user equipment (UE) in a wireless communication system is provided. The method includes receiving, from a base station, a triggering signal to trigger the transmission of the aperiodic SRS and the number of transmission times of the aperiodic SRS, and transmitting the aperiodic SRS to the base station as many as the transmission times through a plurality of subframes based on the triggering signal.

The number of transmission times of the aperiodic SRS may be received by L1/L2 control signaling or higher layer signaling.

The number of transmission times of the aperiodic SRS may be a multiple of 2 or a multiple of 4.

The plurality of subframes through which the aperiodic SRS is transmitted may be SRS subframes set to be cell specific or UE-specific.

The aperiodic SRS may be transmitted through a partial bandwidth obtained by dividing a whole SRS transmission bandwidth by the transmission times in each of the plurality of subframes.

The partial bandwidths of each of the plurality of subframes may not overlap with each other.

The partial bandwidths of each of the plurality of subframes may be consecutively assigned to consecutive subframes.

In another aspect, a user equipment (UE) in a wireless communication system is provided. The UE includes a radio frequency (RF) unit transmitting or receiving a radio signal, and a processor coupled to the RF unit, and configured for receiving, from a base station, a triggering signal to trigger the transmission of the aperiodic SRS and the number of transmission times of the aperiodic SRS, and transmitting the aperiodic SRS to the base station as many as the transmission times through a plurality of subframes based on the triggering signal.

The aperiodic SRS can be efficiently transmitted by one triggering signal.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3$^{rd}$ generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
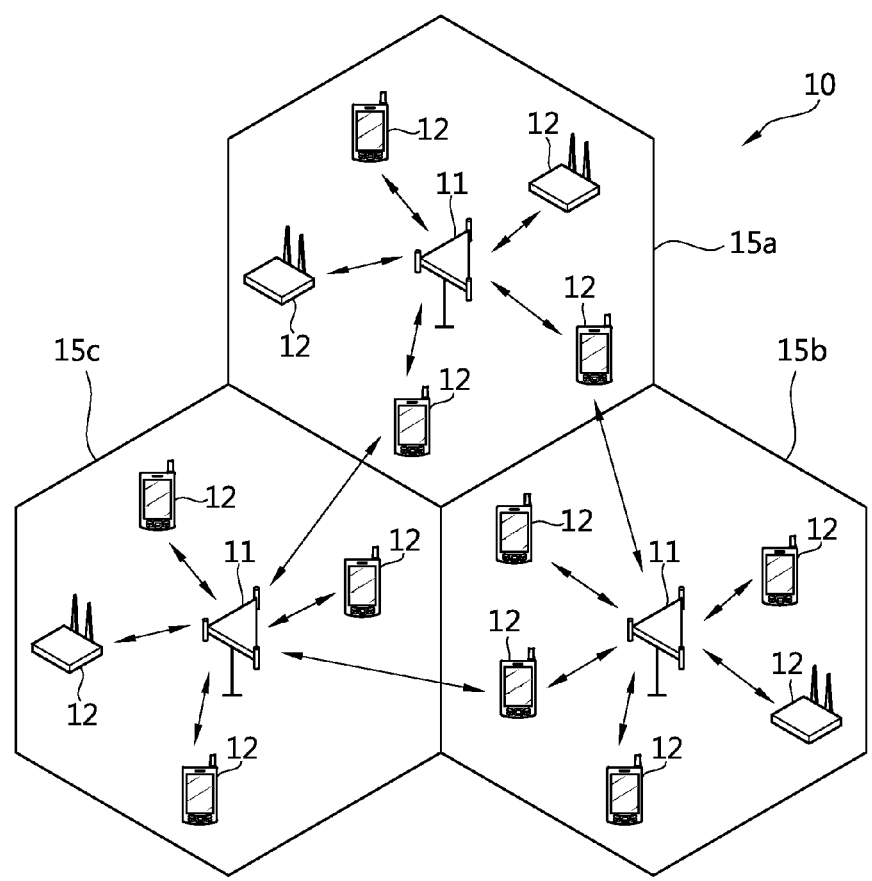
FIG. 1 shows a wireless communication system.

FIG. 1 shows a wireless communication system.
The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as eNB (evolved-NodeB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
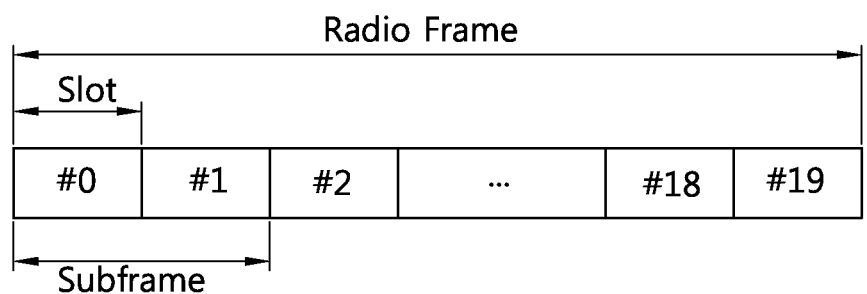
FIG. 2 shows the structure of a radio frame in 3GPP LTE.

FIG. 2 shows the structure of a radio frame in 3GPP LTE. It may be referred to Paragraph 4.2 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
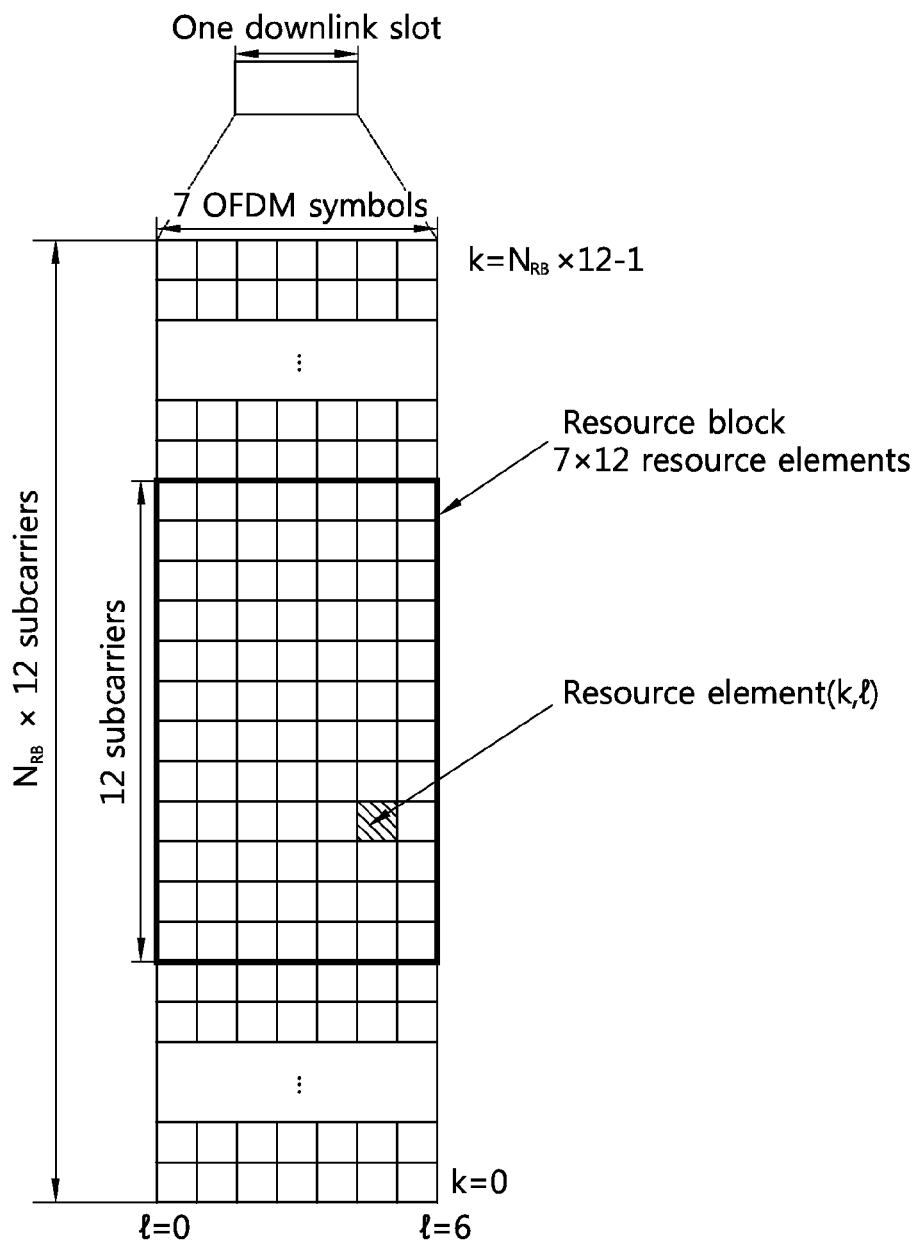
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
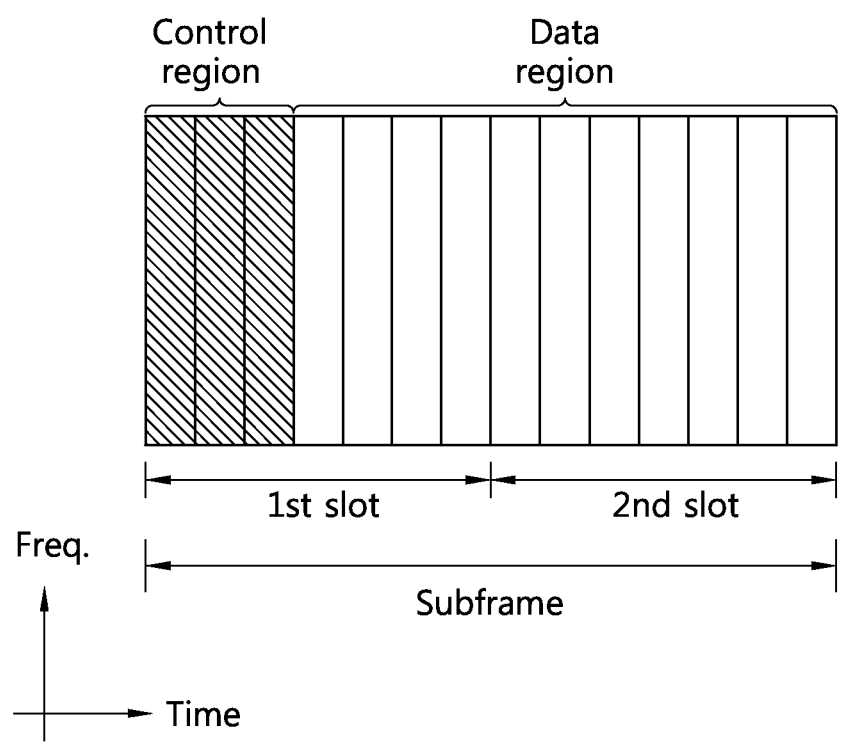
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of a higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC. The DCI to which the CRC is attached may be transmitted by using channel coding and rate matching.

Figure 5:
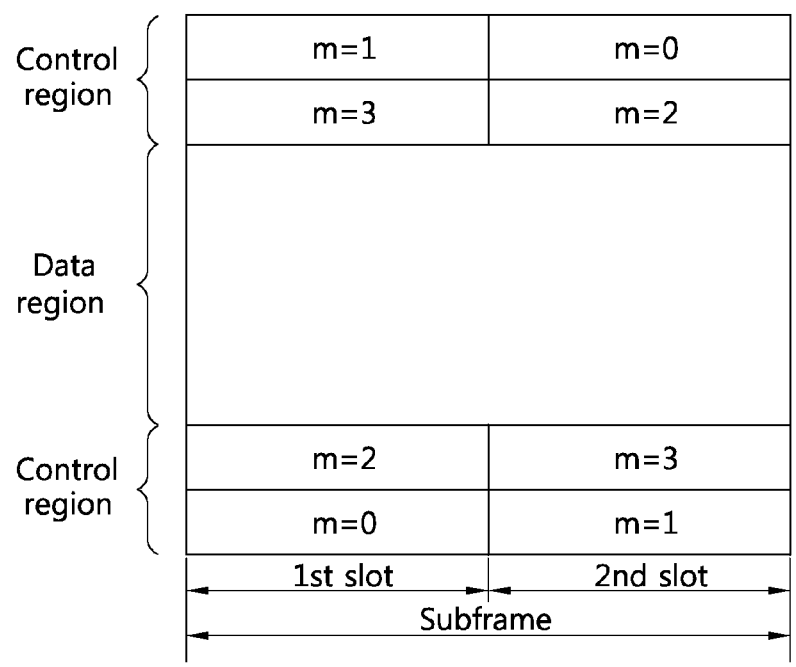
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, an scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a Gold sequence, a Kasami sequence, etc. In addition, the RS sequence may be a cyclically shifted sequence.

The uplink RS can be classified into a demodulation reference signal (DMRS) and a sounding reference signal (SRS). The DMRS is an RS used for channel estimation to demodulate a received signal. The DMRS can be associated with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not associated with PUSCH or PUCCH transmission. The same type of base sequences can be used for the DMRS and the SRS. Meanwhile, precoding applied to the DMRS in uplink multi-antenna transmission may be the same as precoding applied to the PUSCH. Cyclic shift separation is a primary scheme for multiplexing the DMRS. In an LTE-A system, the SRS may not be precoded, and may be an antenna-specific RS.

The SRS is an RS transmitted by a relay station to the BS and is an RS which is not related to uplink data or control signal transmission. In general, the SRS may be used for channel quality estimation for frequency selective scheduling in uplink or may be used for other usages. For example, the SRS may be used in power control, initial MCS selection, initial power control for data transmission, etc. In general, the SRS is transmitted in a last SC-FDMA symbol of one subframe.

A reference signal sequence $r_{u,v}^{(\alpha)}(n)$ may be defined based on a base sequence $b_{u,v}(n)$ and a cyclic shift $\alpha$ according to Equation 2.

$$r_{u,v}^{(\alpha)}(n)=e^{j\alpha n}b_{u,v}(n),\ 0\leq n<M_{sc}^{RS} \quad \text{[Equation 2]}$$

In Equation 2, $M_{sc}^{RS}(1\leq m\leq N_{RB}^{max,UL})$ is the length of the reference signal sequence and $M_{sc}^{RS}=m*N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value $\alpha$ from one base sequence.

A base sequence $b_{u,v}(n)$ is divided into a plurality of groups. Here, $u\in\{0, 1, \ldots, 29\}$ indicates a group index, and v indicates a base sequence index within the group. The base sequence depends on the length $M_{sc}^{RS}$ of the base sequence. Each group includes a base sequence (v=0) having a length of $M_{sc}^{RS}$ for m ($1\leq m\leq 5$) and includes 2 base sequences (v=0,1) having a length of $M_{sc}^{RS}$ for m ($6\leq m\leq n_{RB}^{max,UL}$). The sequence group index u and the base sequence index v within a group may vary according to time as in group hopping or sequence hopping.

In the SRS sequence, u is a PUCCH sequence group index, and v is a base sequence index. The cyclic shift value $\alpha$ is defined by Equation 3 shown below:

$$\alpha = 2\pi\frac{n_{SRS}^{cs}}{8} \quad \text{[Equation 3]}$$

In Equation 3, $n_{SRS}^{cs}$ is a value configured by a higher layer with respect to each UE, which may be any one of integers 0 to 7.

In order to satisfy the transmission power $P_{SRS}$, the SRS sequence is multiplied by an amplitude scaling factor $\beta_{SRS}$ and then mapped to a resource element. The SRS sequence may be mapped, starting from $r_{SRS}(0)$, to a resource element (k,l) according to Equation 4 shown below:

$$a_{2k+k_0,l} = \begin{cases} \beta_{SRS}r^{SRS}(k) & k = 0, 1, \ldots, M_{sc,b}^{RS} - 1 \\ 0 & \text{otherwise} \end{cases} \quad \text{[Equation 4]}$$

In Equation 4, $k_0$ is a starting position in the frequency domain of the SRS, and $M_{sc,b}^{RS}$ is the length of the SRS sequence defined by Equation 5 shown below:

$$M_{sc,b}^{RS}=m_{SRS,b}N_{sc}^{RB}/2 \quad \text{[Equation 5]}$$

In Equation 5, $m_{SRS,b}$ can be given by Table 1 to Table 4 (to be described) with respect to each uplink bandwidth $N_{RB}^{UL}$.

In Equation 4, $k_0$ can be defined by Equation 6 shown below:

$$k_0 = k_0' + \sum_{b=0}^{B_{SRS}} 2M_{sc,b}^{RS}n_b \quad \text{[Equation 6]}$$

In Equation 6, $k_0'$ is given as $k_0'=(\lfloor N_{RB}^{UL}/2\rfloor-m_{SRS,0}/2)N_{SC}^{RB}+k_{TC}$ in a normal uplink subframe. $k_{TC}\in\{0,1\}$ is a parameter given to the UE by a higher layer, and $n_b$ is a frequency position index.

Frequency hopping of the SRS is configured by $b_{hop}\in\{0, 1, 2, 3\}$. When frequency hopping of the SRS is not available ($b_{hop}\geq B_{SRS}$), the frequency position index $n_b$ is determined by the constant $n_b=\lfloor 4n_{RRC}/m_{SRS,b}\rfloor \bmod N_b$, and $n_{RRC}$ of given by the higher layer. When frequency hopping of the SRS is available ($b_{hop}<B_{SRS}$), the frequency position index $n_b$ may be determined by Equation 7 shown below:

$$n_b = \begin{cases} \lfloor 4n_{RRC}/m_{SRS,b}\rfloor \bmod N_b & b \leq b_{hop} \\ \{F_b(n_{SRS}) + \lfloor 4n_{RRC}/m_{SRS,b}\rfloor\} \bmod N_b & \text{otherwise} \end{cases} \quad \text{[Equation 7]}$$

In Equation 7, $n_b$ is determined by Table 1 to Table 4 (to be described), and $F_b(n_{SRS})$ may be determined by Equation 8 shown below:

$$F_b(n_{SRS}) = \begin{cases} (N_b/2)\left\lfloor \dfrac{n_{SRS} \bmod \Pi^b_{b'=b_{hop}} N_{b'}}{\Pi^{b-1}_{b'=b_{hop}} N_{b'}} \right\rfloor + \left\lfloor \dfrac{n_{SRS} \bmod \Pi^b_{b'=b_{hop}} N_{b'}}{2\Pi^{b-1}_{b'=b_{hop}} N_{b'}} \right\rfloor & \text{if } N_b \text{ even} \\ \lfloor N_b/2 \rfloor \lfloor n_{SRS}/\Pi^{b-1}_{b'=b_{hop}} N_{b'} \rfloor & \text{if } N_b \text{ odd} \end{cases}$$

[Equation 8]

In Equation 8, $n_{SRS}$ indicates the number of UE-specific SRS transmissions, which may be determined by Equation 9 shown below:

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2 ms SRS periodicity of frame structure 2} \\ \lfloor (n_f \times 10 + \lfloor n_s/2 \rfloor)/T_{SRS} \rfloor, & \text{otherwise} \end{cases}$$

[Equation 9]

In Equation 9, $T_{SRS}$ is UE-specific periodicity, $T_{offset}$ is an SRS subframe offset, and $T_{offset\_max}$ is a maximum value of $T_{offset}$ for a particular configuration of an SRS subframe offset. $T_{SRS}$ and $T_{offset}$ can be given by Table 7 and Table 8 shown below.

Table 1 to Table 4 show an example of SRS bandwidth configurations. A 3-bit cell-specific parameter may be broadcast in order to indicate a configuration of one of eight bandwidths. Also, a 2-bit UE-specific parameter may be given by a higher layer in order to indicate a configuration of one of four bandwidths.

Table 1 shows an example of $m_{SRS,b}$ and $N_b$ (b=0, 1, 2, 3) when an uplink bandwidth $N_{RB}^{UL}$ is within the range of $6 \leq N_{RB}^{UL} \leq 40$.

TABLE 1

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 2 shows an example of $M_{SRS,b}$ and $N_b$ (b=0, 1, 2, 3) when an uplink bandwidth $N_{RB}^{UL}$ is within the range of $40 \leq N_{RB}^{UL} \leq 60$.

TABLE 2

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 3 shows an example of $m_{SRS,b}$ and $N_b$ (b=0, 1, 2, 3) when an uplink bandwidth $N_{RB}^{UL}$ is within the range of $60 \leq N_{RB}^{UL} \leq 80$.

TABLE 3

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 4 shows an example of $M_{SRS,b}$ and $N_b$ (b=0, 1, 2, 3) when an uplink bandwidth $N_{RB}^{UL}$ is within the range of $80 \leq N_{RB}^{UL} \leq 110$.

TABLE 4

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Table 1 to Table 4, $C_{SRS} \in \{0,1,2,3,4,5,6,7\}$, a cell-specific parameter, and $B_{SRS} \in \{0,1,2,3\}$, a UE-specific parameter, are given by a higher layer.

Table 5 and 6 show examples of a cell-specific subframe configuration period parameter $T_{SFC}$ and a cell-specific subframe offset parameter $\Delta_{SFC}$ with respect to SRS transmission.

Table 5 shows an example of an SRS subframe configuration in the FDD system. According to Table 5, the SRS subframe configuration can be indicated by a parameter having a 4-bit length and the period of the SRS subframe may be any one of 1, 2, 5, and 10 subframes.

TABLE 5

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 6 shows an example of an SRS subframe configuration in the TDD system.

TABLE 6

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

The operation by the UE for an SRS transmission is as follows.

When the UE transmits an SRS, transmission power $P_{SRS}$ in a subframe i can be determined by Equation 10 shown below.

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\}$$ [Equation 10]

In Equation 10, $P_{CMAX}$ is pre-determined transmission power of the UE. $P_{SRS\_OFFSET}$ is a UE-specific parameter having a 4-bit length semi-statically determined by a higher layer. When Ks=1.25, $P_{SRS\_OFFSET}$ may be determined in units of 1 dB within the range of [−3, 12] dB. When Ks=0, $P_{SRS\_OFFSET}$ may be determined in units of 1.5 dB within the range of [−10.5, 12] dB. $M_{SRS}$ is a bandwidth of an SRS transmission indicated by the number of resource blocks, and $P_{O\_PUSCH}(j)$ is a parameter configured by the sum of $P_{O\_NOMINAL\_PUSCH}(j)$, a cell-specific nominal component given by a higher layer, and $P_{O\_UE\_PUSCH}(j)$, a UE-specific component also given by the higher layer. $\alpha(j)$ is a 3-bit cell-specific parameter given by the higher layer, PL is an estimated value of pathloss calculated by the UE, and f(i) indicates a current power control adjustment state with respect to the PUSCH.

In case in which the UE can select a transmission antenna, an index of a UE antenna $a(n_{SRS})$ for transmitting SRS during an $n_{SRS}$ time is given as $a(n_{SRS})=n_{SRS} \mod 2$ with respect to the entire sounding bandwidth or a partial sounding bandwidth when frequency hopping is not available, and it may be given by Equation 11 shown below when frequency hopping is available.

$$a(n_{SRS}) = \begin{cases} (n_{SRS} + \lfloor n_{SRS}/2 \rfloor + \beta \cdot \lfloor n_{SRS}/K \rfloor) \mod 2 & \text{when } K \text{ is even} \\ n_{SRS} \mod 2 & \text{when } K \text{ is odd} \end{cases}$$ [Equation 11]

In Equation 11, $B_{SRS}$ is an SRS bandwidth and $b_{hop}$ is a frequency hopping bandwidth, $N_b$ may be determined by a predetermined table according to $C_{SRS}$ and $B_{SRS}$, and $$K = \prod_{b'=b_{hop}}^{B_{SRS}} N_{b'}.$$

In Equation 11, $\beta$ can be determined by Equation 12 shown below:

$$\beta = \begin{cases} 1 & \text{where } K \mod 4 = 0 \\ 0 & \text{otherwise} \end{cases}$$ [Equation 12]

In the TDD system, when a single SC-FDMA symbol exists in a uplink pilot time slot (UpPTS), the corresponding SC-FDMA symbol can be used for the SRS transmission. When two SC-FDMA symbols exist in the UpPTS, the corresponding two SC-FDMA symbols can be all used for the SRS transmission and can be simultaneously allocated to a single UE.

When the SRS transmission and the transmission of the PUCCH format 2/2a/2b concurrently occur in the same subframe, the UE does not transmit the SRS anytime.

In case in which the ackNackSRS-SimultaneousTransmission parameter is false, when the SRS transmission and the transmission of the PUCCH carrying the ACK/NACK and/or the positive SR are preformed in the same subframe, the UE do not always transmit the SRS. Also, In case in which the ackNackSRS-SimultaneousTransmission parameter is true, when the SRS transmission and the transmission of the PUCCH carrying the ACK/NACK and/or the positive SR are configured in the same subframe, the UE uses a shortened PUCCH format and simultaneously transmits the PUCCH carrying the ACK/NACK and/or positive SR and the SRS. Namely, when the PUCCH carrying the ACK/NACK and/or positive SR is configured in the SRS subframe which is set to be cell-specific, the UE uses the shortened PUCCH format and simultaneously transmits the PUCCH carrying the ACK/NACK and/or positive SR and the SRS. When the SRS transmission overlaps with a physical random access channel (PRACH) for a preamble format 4 or when it exceeds the range of the uplink system bandwidth configured in the cell, the UE does not transmit the SRS.

The parameter, ackNackSRS-SimultaneousTransmission, given by the higher layer determines whether or not the UE supports simultaneous transmission of the PUCCH carrying the ACK/NACK and the SRS in a single subframe. When the UE is configured to simultaneously transmit the PUCCH carrying the ACK/NACK and the SRS in a single subframe, the UE can transmit the ACK/NACK and the SRS in a cell-specific SRS subframe. At this time, the shortened PUCCH format may be used, and a transmission of an SR or ACK/NACK corresponding to a position at which the SRS is transmitted is omitted (or punctured). When shortened PUCCH format is used in the cell-specific SRS subframe even when the SRS is not transmitted in the corresponding subframe. When the UE is configured not to simultaneously transmit the PUCCH carrying the ACK/NACK and the SRS in a single subframe, the UE may use a general PUCCH format 1/1a/1b in order to transmit the ACK/NACK and SR.

Table 7 and Table 8 show an example of a UE-specific SRS configuration indicating an SRS transmission period $T_{SRS}$ and a subframe offset $T_{offset}$. The SRS transmission period $T_{SRS}$ may be determined to be any one of {2, 5, 10, 20, 40, 80, 160, 320} ms.

Table 7 shows an example of an SRS configuration in the FDD system.

TABLE 8-continued

| Configuration Index $I_{SRS}$ | SRS Periodicity $T_{SRS}$ (ms) | SRS Subframe Offset $T_{offset}$ |
|---|---|---|
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

In case in which $T_{SRS}>2$ in the TDD system and in case of the FDD system, the SRS subframe satisfies $(10*n_f+k_{SRS}-T_{offset})$ mod $T_{SRS}=0$. $n_f$ indicates a frame index, and $k_{SRS}$ is a subframe index in a frame in the FDD system. In the TDD system, when $T_{SRS}=2$, two SRS resources can be configured in a half frame including at least one uplink subframe and the SRS subframe satisfies $(k_{SRS}-T_{offset})$mod 5=0.

In the TDD system, $k_{SRS}$ may be determined as shown in Table 9 below.

TABLE 9

| | subframe index n | | | | | | | | | |
|---|---|---|---|---|---|---|---|---|---|---|
| | | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 8 shows an example of an SRS configuration in the TDD system.

TABLE 8

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |

Meanwhile, when the SRS transmission and a transmission of the PUSCH corresponding to a re-transmission of the same transport block as part of a random access response grant or a contention-based access procedure is performed in the same subframe, the UE does not transmit the SRS anytime.

A SRS transmission method can be classified into two. There are a periodic SRS transmission method that periodically transmits an SRS according to an SRS parameter received by radio resource control (RRC) signaling as defined in LTE rel-8, and an aperiodic SRS transmission method that transmits an SRS whenever necessarily on the basis of a message dynamically triggered from a BS. The aperiodic SRS transmission method can be used in LTE-A.

In the periodic SRS transmission method and the aperiodic SRS transmission method, an SRS can be transmitted in a UE-specific SRS subframe determined in a UE-specific manner. In a periodic SRS transmission method defined in LTE rel-8, a cell-specific SRS subframe is configured periodically by a cell-specific SRS parameter, and periodic SRS transmission is performed in a periodic UE-specific SRS subframe configured by a UE-specific SRS parameter among cell-specific SRS subframes. In this case, the periodic UE-specific SRS subframe may be a subset of the cell-specific subframe. The cell-specific SRS parameter can be given by a higher layer. In the aperiodic SRS transmission method, an aperiodic SRS can be transmitted in an aperiodic UE-specific SRS subframe determined by a UE-specific aperiodic SRS parameter. The aperiodic UE-specific SRS subframe of the aperiodic SRS transmission method may be a subset of the cell-specific SRS subframe as defined in the LTE rel-8.

Alternatively, the aperiodic UE-specific SRS subframe may be the same as the cell-specific subframe. The UE-specific aperiodic SRS parameter may also be given by a higher layer similarly to the cell-specific SRS parameter. The UE-specific aperiodic SRS subframe can be configured by the aforementioned subframe periodicity and subframe offset of Table 7 or Table 8.

A BS may transmit a triggering signal to a UE in order to trigger transmission of an aperiodic SRS of the UE. A signal to trigger of the transmission of the aperiodic SRS of the UE may be transmitted through a bit newly defined in a DCI format 0 or 1A. The size of the aperiodic SRS triggering bit within the DCI format 0 or 1A may be 1 bit. When the aperiodic SRS triggering bit is 1 bit, any one of two statuses which may be indicated by the aperiodic SRS triggering bit is set to trigger the transmission of the aperiodic SRS and the other one may be set not to trigger the transmission of the aperiodic SRS. Further, the aperiodic SRS triggering signal newly defined within the DCI format 0 or 1A may be activated by an aperiodic SRS activation signal. That is, the aperiodic SRS activation signal may be used to indicate whether the aperiodic SRS is triggered by the aperiodic SRS triggering bit within the DCI format 0 or 1A. The aperiodic SRS activation signal may be subjected to RRC signaling. The size of the aperiodic SRS activation signal may be 1 bit. That is, when a value of the aperiodic SRS activation signal is 1, the aperiodic SRS triggering bit indicating the triggering of the aperiodic SRS may be defined.

Hereinafter, a method for transmitting an aperiodic SRS according to embodiments of the present invention will be described. The present invention presents multi-shot transmission to transmit the aperiodic SRS several times by one-time triggering. Further, the present invention also presents a method of applying the multi-shot transmission of the aperiodic SRS to frequency hopping.

Figure 6:
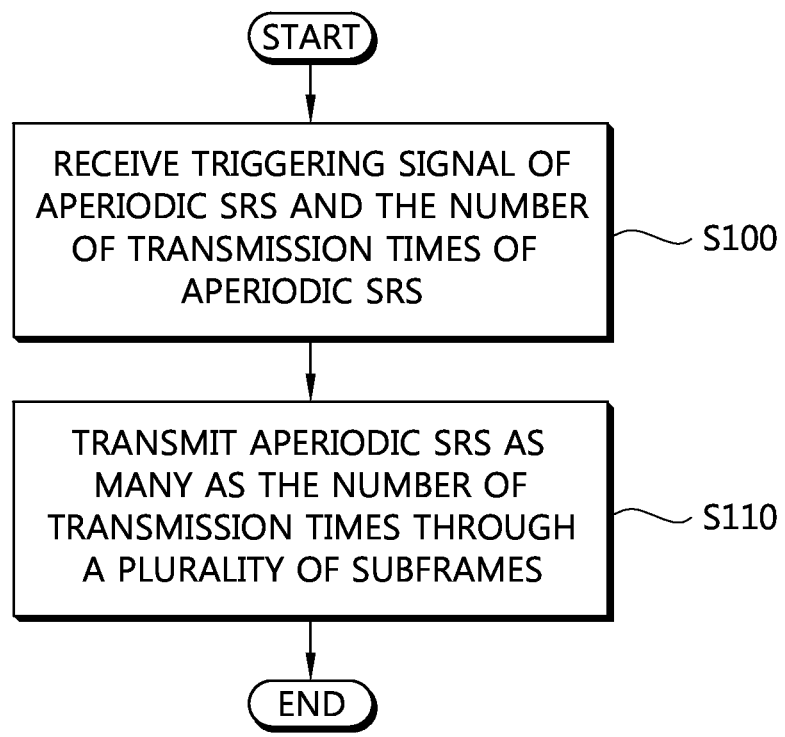
FIG. 6 shows an example of a method for transmitting an aperiodic SRS according to an embodiment of the present invention.

FIG. 6 shows an example of a method for transmitting an aperiodic SRS according to an embodiment of the present invention.

In step S100, a UE receives a triggering signal to trigger the transmission of the aperiodic SRS and the number of transmission times of the aperiodic SRS from a base station. In step S110, the UE transmits the aperiodic SRS to the base station as many as the transmission times through a plurality of subframes based on the triggering signal. The number of transmission times of the aperiodic SRS may be received by L1/L2 control signaling or higher layer signaling.

A transmission bandwidth of the aperiodic SRS may be configured based on SRS hopping information and the number of transmission times of the aperiodic SRS. When the number of transmission times 1, the UE may transmit the aperiodic SRS through a cell-specific or UE-specific SRS transmission bandwidth set through a PDCCH or higher layer signaling for transmitting the aperiodic SRS. When the number of transmission times is more than 1, the UE may divide a whole SRS transmission bandwidth by the number of transmission times and transmit the aperiodic SRS through the divided bandwidths divided in each subframe. In this case, when SRS hopping is applied, the bandwidths through which the aperiodic SRS is transmitted may be different in the respective subframes.

Figure 7:
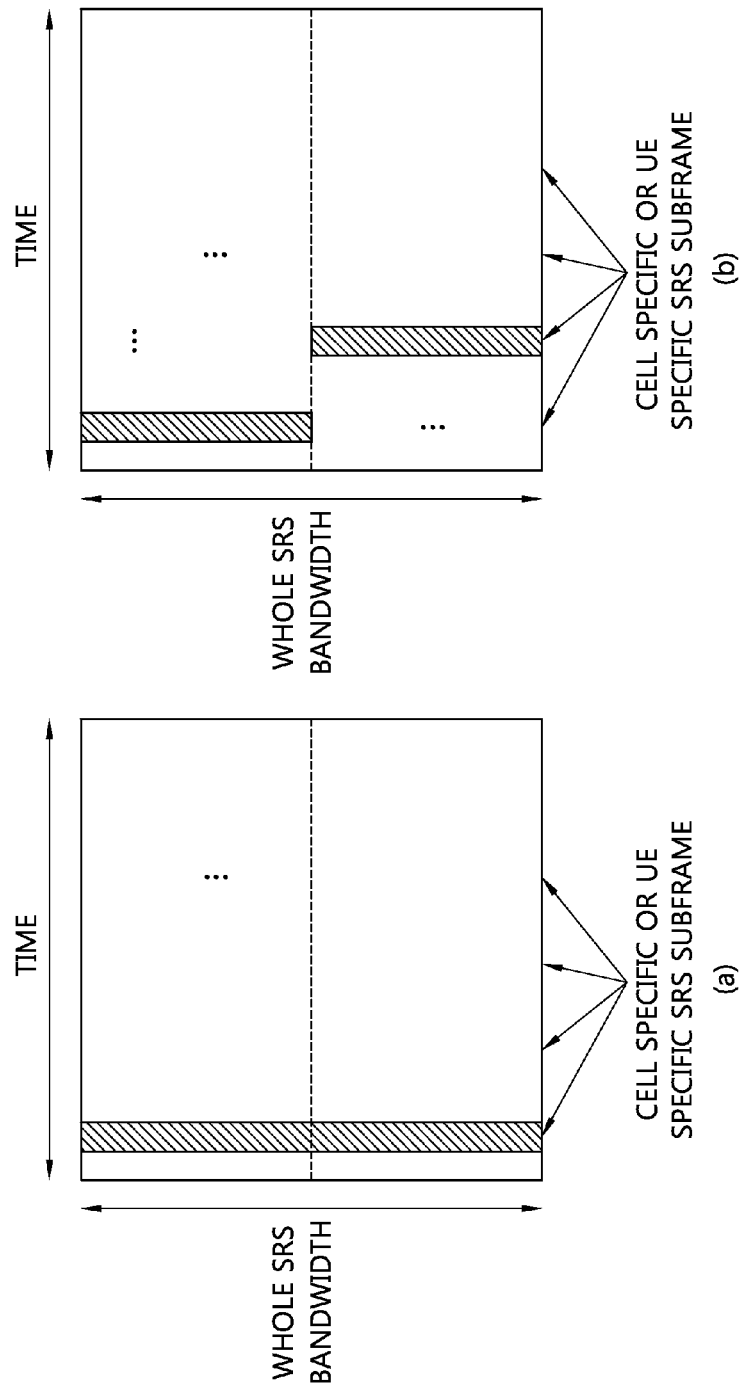
FIG. 7 shows an example of a configuration of an SRS transmission bandwidth based on a method for transmitting an aperiodic SRS according to an embodiment of the present invention.

FIG. 7 shows an example of a configuration of an SRS transmission bandwidth based on a method for transmitting an aperiodic SRS according to an embodiment of the present invention.

FIG. 7-(a) shows the SRS transmission bandwidth configuration when the number of transmission times is 1. Since the aperiodic SRS is transmitted only once by the triggering signal, the UE transmits the aperiodic SRS through the whole SRS transmission bandwidth in a cell-specific or UE-specific SRS subframe.

FIG. 7-(b) shows the SRS transmission bandwidth configuration when the number of transmission times is 2. Since the aperiodic SRS is transmitted twice by the triggering signal, the UE transmits the aperiodic SRS through a transmission bandwidth of ½ of the whole SRS transmission bandwidth in each cell-specific or UE-specific SRS subframe. In this case, when the SRS hopping is applied, the transmission bandwidths of the aperiodic SRS transmitted in the respective cell-specific or UE-specific subframes may be different from each other. That is, as shown in FIG. 7-(b), the UE may transmit the aperiodic SRS through an upper half of the whole SRS transmission bandwidth in a first cell-specific or UE-specific subframe and transmit the aperiodic SRS through a lower half of the whole SRS transmission bandwidth in a second cell-specific or UE specific-subframe.

Figure 8:
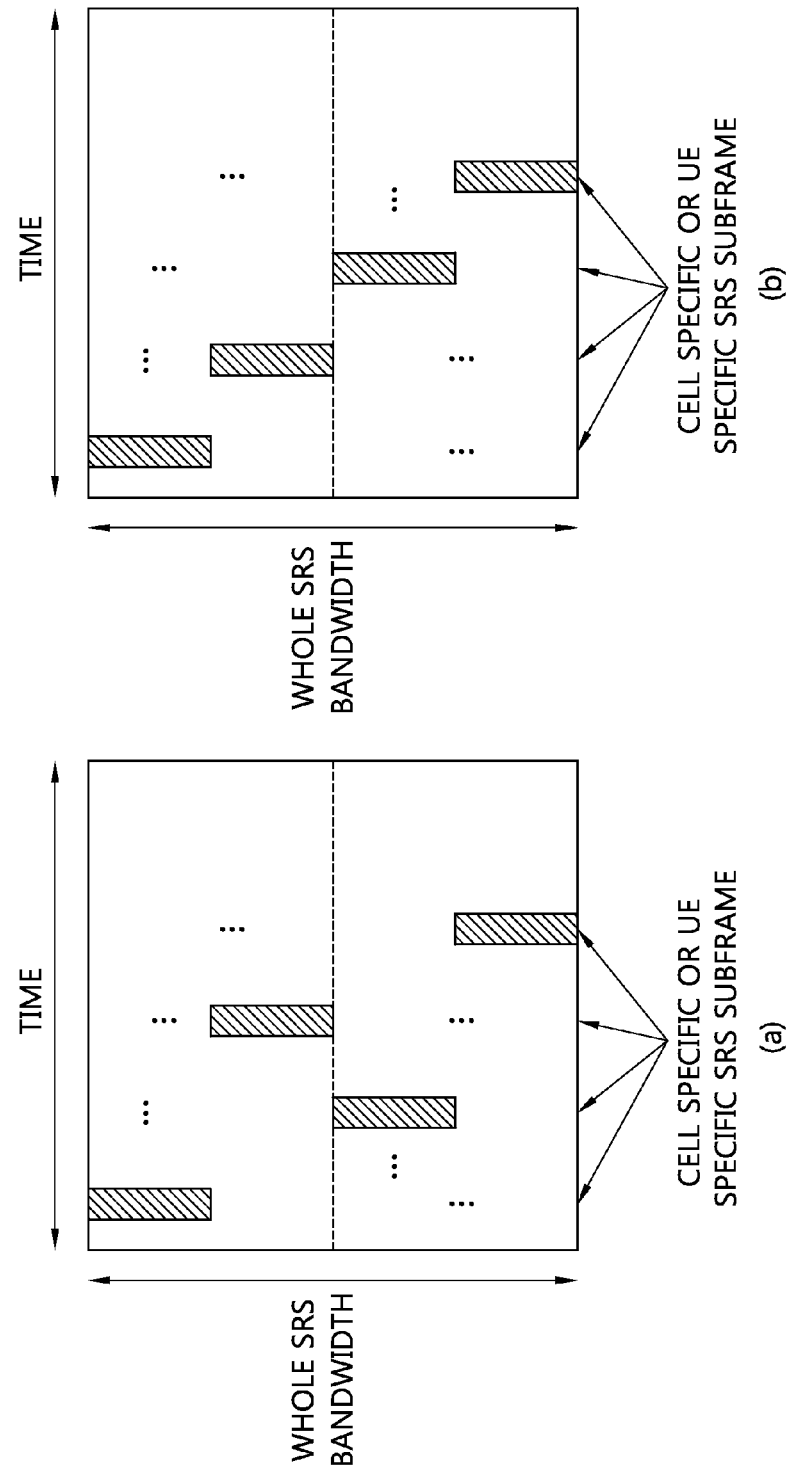
FIG. 8 shows another example of a configuration of an SRS transmission bandwidth based on a method for transmitting an aperiodic SRS according to an embodiment of the present invention.

FIG. 8 shows another example of a configuration of an SRS transmission bandwidth based on a method for transmitting an aperiodic SRS according to an embodiment of the present invention.

FIG. 8 shows the SRS transmission bandwidth configuration when the number of transmission times is 4. Since the aperiodic SRS is transmitted four times by the triggering signal, the UE transmits the aperiodic SRS through a transmission bandwidth of ¼ of the whole SRS transmission bandwidth in each cell-specific or UE-specific SRS subframe. In this case, when the SRS hopping is applied, the transmission bandwidths of the aperiodic SRS transmitted in the respective cell-specific or UE-specific subframes may be different from each other. FIG. 8-(a) shows a case in which the transmission bandwidths in which the aperiodic SRS is transmitted in the respective cell-specific or UE-specific SRS subframes are differently assigned by an SRS hopping mechanism of LTE rel-8. FIG. 8-(b) shows a case in which the transmission bandwidth of the aperiodic SRS is consecutively hopped and assigned to consecutive cell-specific or UE-specific SRS subframes.

When the transmission bandwidth of the aperiodic SRS is configured based on the SRS hopping information and the number of transmission times of the aperiodic SRS, the number of transmission times of the aperiodic SRS is preferably a multiple of 4 or a multiple of 2. When it is considered that the SRS transmission bandwidth is assigned by the unit of 4 RB in the LTE rel-8, the number of transmission times of the aperiodic SRS is preferably set to the multiple of 4 in order to maintain backward compatibility. Alternatively, as the number of transmission antennas of the UE increases, SRS transmission power may be decreased, and the number of transmission times of the aperiodic SRS may be preferably the multiple of 2 in order to conserve a decrease of a coverage which is caused due to the decrease of the SRS transmission power. Therefore, the same coverage as in a case in which the SRS transmission bandwidth is set to minimum 4 RB may be obtained.

Figure 9:
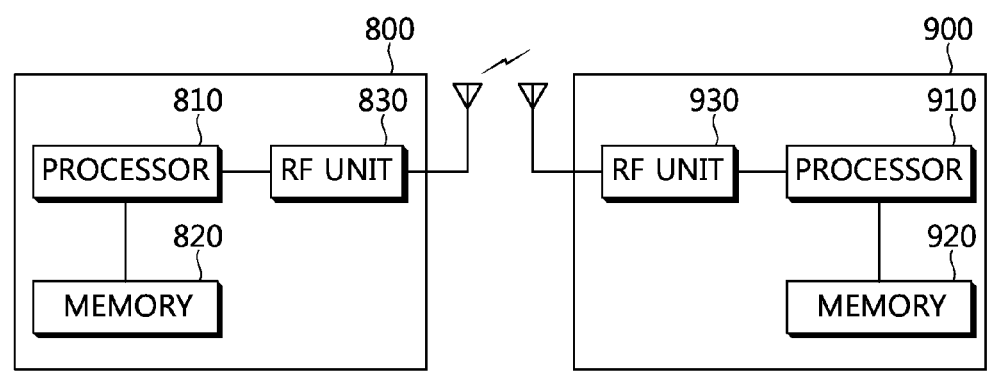
FIG. 9 is a block diagram showing wireless communication system to implement an embodiment of the present invention.

FIG. 9 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting an aperiodic sounding reference signal (SRS) by a user equipment (UE) in a wireless communication system, the method comprising:

receiving, from a base station, a triggering signal to trigger the transmission of the aperiodic SRS and a number of transmission times of the aperiodic SRS; and transmitting, through a plurality of subframes based on the triggering signal, the aperiodic SRS to the base station the number of transmission times received from the base station, wherein the aperiodic SRS is transmitted through a partial bandwidth obtained by dividing a whole SRS transmission bandwidth by the number of transmission times in each of the plurality of subframes, and wherein the partial bandwidths of the plurality of subframes do not overlap with each other.

2. The method of claim 1, wherein the number of transmission times of the aperiodic SRS is received by L1/L2 control signaling or higher layer signaling.

3. The method of claim 1, wherein the number of transmission times of the aperiodic SRS is a multiple of 2 or a multiple of 4.

4. The method of claim 1, wherein the plurality of subframes through which the aperiodic SRS is transmitted are SRS subframes set to be cell specific or UE-specific.

5. A user equipment (UE) in a wireless communication system, the UE comprising:

a radio frequency (RF) unit configured to transmit or receive a radio signal; and a processor coupled to the RF unit, and configured to:

receive, from a base station, a triggering signal to trigger the transmission of the aperiodic SRS and a number of transmission times of the aperiodic SRS, and transmit, through a plurality of subframes based on the triggering signal, the aperiodic SRS to the base station the number of transmission times received from the base station, wherein the aperiodic SRS is transmitted through a partial bandwidth obtained by dividing a whole SRS transmission bandwidth by the number of transmission times in each of the plurality of subframes, and wherein the partial bandwidths of the plurality of subframes do not overlap with each other.

6. The method of claim 1, wherein the partial bandwidths of each of the plurality of subframes are consecutively assigned to consecutive subframes.

7. The UE of claim 6, wherein the number of transmission times of the aperiodic SRS is received by L1/L2 control signaling or higher layer signaling.

8. The UE of claim 6, wherein the number of transmission times of the aperiodic SRS is a multiple of 2 or a multiple of 4.

9. The UE of claim 6, wherein the plurality of subframes through which the aperiodic SRS is transmitted are SRS subframes set to be cell specific or UE-specific.

10. The UE of claim 6, wherein the partial bandwidths of each of the plurality of subframes are consecutively assigned to consecutive subframes.

* * * * *